(12) United States Patent
Schultz et al.

(10) Patent No.: US 6,785,324 B1
(45) Date of Patent: Aug. 31, 2004

(54) TRANSCEIVER INCLUDING REACTIVE TERMINATION FOR ENHANCED CROSS-MODULATION PERFORMANCE AND RELATED METHODS

(75) Inventors: Richard Douglas Schultz, Palm Bay, FL (US); Raphael Leite B. Matarazzo, Satellite Beach, FL (US)

(73) Assignee: Intersil Corporation, Palm Bay, FL (US)

( * ) Notice: Subject to any disclaimer, the term of this patent is extended or adjusted under 35 U.S.C. 154(b) by 0 days.

(21) Appl. No.: 09/426,847

(22) Filed: Oct. 26, 1999

(51) Int. Cl.[7] .............................. H04B 1/38; H04L 5/16
(52) U.S. Cl. ........................ 375/219; 375/130; 375/285
(58) Field of Search ................................ 375/130, 147, 375/148, 219, 222, 224, 227, 259, 260, 285, 296, 297, 316, 346, 348; 455/73; 330/268, 274

(56) References Cited

U.S. PATENT DOCUMENTS

| | | | |
|---|---|---|---|
| 4,131,859 A | * 12/1978 | Valle ....................... 330/124 R |
| 5,170,500 A | * 12/1992 | Broderick ................... 455/315 |
| 5,333,176 A | * 7/1994 | Burke et al. ................ 455/557 |
| 5,351,269 A | 9/1994 | Schilling ........................ 375/1 |
| 5,398,004 A | 3/1995 | Kobayashi ................... 330/293 |
| 5,483,549 A | 1/1996 | Weinberg et al. ............ 375/200 |
| 5,557,641 A | 9/1996 | Weinberg .................... 375/295 |
| 5,577,066 A | 11/1996 | Schuchman et al. ......... 375/222 |
| 5,588,020 A | 12/1996 | Schilling ..................... 370/337 |
| 5,638,141 A | * 6/1997 | Bae et al. ................. 455/245.2 |
| 5,678,213 A | 10/1997 | Myer .......................... 455/209 |
| 5,703,874 A | 12/1997 | Schilling .................... 370/335 |
| 5,748,042 A | * 5/1998 | Norris et al. ............... 330/277 |
| 5,758,266 A | 5/1998 | Kornfeld et al. .............. 455/86 |
| 5,758,271 A | 5/1998 | Rich et al. ............... 455/234.1 |
| 5,768,684 A | 6/1998 | Grubb et al. .............. 455/13.4 |
| 6,008,696 A | * 12/1999 | Smith ......................... 330/260 |
| 6,125,107 A | * 9/2000 | Johnson et al. ............. 370/241 |
| 6,166,599 A | * 12/2000 | Aparin et al. ............... 375/296 |
| 6,175,279 B1 | * 1/2001 | Ciccarelli et al. ........... 330/296 |
| 6,230,031 B1 | * 5/2001 | Barber ....................... 455/571 |
| 6,255,906 B1 | * 7/2001 | Eidson et al. ................. 330/51 |
| 6,388,526 B1 | * 5/2002 | Daniel et al. ............... 330/285 |
| 6,445,729 B1 | * 9/2002 | Kang ......................... 375/219 |
| 6,680,660 B2 | * 1/2004 | Nguyen ...................... 333/133 |

* cited by examiner

*Primary Examiner*—Jean B. Corrielus
(74) *Attorney, Agent, or Firm*—Hunton & Williams LLP (57) ABSTRACT

A full-duplex radio transceiver includes a transmitter and a receiver. A duplexer is connected to an output of the transmitter and an input of the receiver. The receiver includes a low noise amplifier having a nonlinear portion capable of generating undesired cross-modulation signals based upon a portion of the transmit signal coupled thereto from the duplexer and a signal from another adjacent transmitter. A bandpass filter is connected to an output of the low noise amplifier, and at least one downconverter stage is connected to an output of the bandpass filter. A reactive termination circuit is connected between the low noise amplifier and the bandpass filter for changing an impedance presented to the output of the low noise amplifier with respect to signals from the colocated transmitter to thereby reduce undesired cross-modulation signals.

32 Claims, 9 Drawing Sheets

TRANSCEIVER INCLUDING REACTIVE TERMINATION FOR ENHANCED CROSS-MODULATION PERFORMANCE AND RELATED METHODS

FIELD OF THE INVENTION

The present invention relates to the field of electronics, and, more particularly, to a radio frequency (RF) transceiver.

BACKGROUND OF THE INVENTION

An RF transceiver, such as a cellular telephone, includes a transmitter and a receiver. Cellular telephones are typically full-duplex systems, that is, they can simultaneously transmit and receive voice and/or data information. The transmitter operates over a first assigned frequency band, and the receiver operates over a second assigned frequency band. The transmitter and receiver are typically connected to and share a common antenna through a duplexer.

RF signals received by the antenna are directed to the duplexer, which allows the desired signals to pass through to the receiver. These received signals are amplified by a low noise amplifier (LNA) before down conversion to an intermediate frequency (IF). Unfortunately, the duplexer may not provide sufficient attenuation to undesired signals. Consequently, some of the undesired signals are applied to the input of the LNA, even though at a reduced level.

One source of the undesired signals is from the transmitter colocated with the receiver in the housing of the cellular telephone. For example, a modulated signal from the transmitter may be coupled to the receiver through the duplexer. Another source of the undesired signals is from the transmitters of other cellular telephones or base stations operating nearby. An undesired signal generated by a transmitter external to the radio transceiver is typically referred to as a jammer signal.

Unfortunately, the undesired signals can interact with each other within the receiver through a process known as cross-modulation to produce a new interfering signal at the same frequency as the desired received signal. This problem becomes worse as the ratio of the undesired signals to the level of the desired signals increases.

Cross-modulation distortion can thus develop in the presence of two or more interfering signals. The two or more interfering signals are separated from the assigned input signal frequency and from each other such that the Nth order mixing of the interfering signals that occurs in a nonlinear device in the receiver produces a higher order intermodulation distortion product whose frequency is within the assigned input frequency band. The transfer functions of electronic devices commonly used in amplifying and mixing circuits within the receivers are seldom, if ever, perfectly linear. In other words, the non-ideal characteristics inherent in these devices leads to cross-modulation and intermodulation distortions.

A typical non-ideal linear element in the receiver is the LNA. Assuming the input stage of the LNA meets input linearity requirements, it is desirable that the output stage of the amplifier not distort the output signals due to voltage or current limitations of the amplifier. That is, if the output of the LNA includes desired and undesired signals, they must both be fully amplified. Consequently, this puts a higher demand on the LNA in terms of supply voltage and/or current headroom requirements.

The need to reduce cross-modulation distortion is further emphasized since cellular telephones are being designed to operate with ever lower supply voltages. For example, current cellular telephones are designed to operate with a power supply having a range of about 2.7 to 3.3 volts. This level was previously in the 5 volt range. Therefore, if the undesired out-of-band signals were reduced or eliminated, then the LNA could operate at lower supply voltages since it need only amplify the desired signals.

One well known form of non-linear distortion is a third order intermodulation distortion product which is directly related to cross-modulation. A 1 dB change in signal strength of the interfering signals results in a 3 dB change in signal strength of the undesired third order intermodulation distortion product. One approach to reduce the third order intermodulation distortion product is to increase the bias current of the LNA. However, portable cellular telephones obtain their power from portable power sources. These portable cellular telephones are thus designed to minimize power consumption to get maximum use in either a low current standby mode, i.e., when the cellular telephone is waiting for an incoming call, or a high current active use mode, i.e., when the cellular telephone is receiving speech or data. Increasing the current gain in the receiver to reduce intermodulation distortion is not desirable because the increased current drain reduces the amount of time that the cellular telephone can be used.

Another approach to reducing the third order intermodulation distortion products is to decrease the gain of the receiver front end. Radio designers typically refer to the stages in the receiver closest to the antenna as the front end and the stages furthest from the antenna as the receiver back end. Traditionally, the receiver front end gain is set sufficiently high to overcome the worst case receiver back end noise figure to achieve acceptable sensitivity. Typically, an LNA having a fixed gain is the first active stage in the receiver front end. The gain of the LNA is set high for a minimum receiver noise figure resulting in acceptable receiver sensitivity.

The penalty for high LNA gain, however, is linearity. As the LNA gain increases, the stages following the LNA, such as the downconverter, must be made more linear to maintain the same intermodulation performance. Unfortunately, higher linearity typically requires higher DC power dissipation which is undesirable for battery-operated cellular telephones. Conversley, if the LNA gain is lowered to improve intermodulation performance, the receiver sensitivity degrades.

A number of other techniques have been developed to attempt to reduce third order intermodulation distortion. For example, U.S. Pat. No. 5,758,271 to Rich et al. discloses a code division multiple access (CDMA) radio receiver wherein the gain of the radio receiver is adjusted responsive to the quality of the received signal to optimize the quality of the received signal. Since the adjusted gain also changes a received signal strength indication (RSSI) of the received signal, the RSSI of the received signal is estimated and compensated responsive to the gain of the radio receiver to produce a compensated RSSI of the received signal indicative of the RSSI of a desired RF signal.

U.S. Pat. No. 5,588,020 to Schilling discloses a spread spectrum CDMA communication system for communicating data between a plurality of personal communications network (PCN) users. A comb notch filter is connected to the output of a low noise amplifier via a downconverter. The comb notch filter notches the predetermined channels of the mobile cellular system for reducing the combined interfering power levels for mobile cellular users with a PCN base station.

U.S. Pat. No. 5,398,004 to Kobayashi discloses a wideband low noise amplifier having a first and a second feedback path. The bandwidth of the first feedback path is on the order of 2 GHz while the bandwidth of the second feedback path is on the order of 5 GHz. A resistor in the second feedback path is selected to optimize noise match, provide gain-bandwidth adjustment, and DC bias stabilization. The second feedback resistor also provides RF shunt feedback which can be adjusted to determine the gain-bandwidth response and input matching to the system performance. Kobayashi also discloses an alternative embodiment that includes the addition of an inductor connected in series with the second feedback resistor. The inductor is selected to provide an inductive reactance component that helps to further match the effective reactant's component that is exhibited by a given system input.

U.S. Pat. No. 5,557,641 to Weinberg discloses a CDMA communication system having a charged coupled device (CCD) component performing a variety of functions, including filtering. The CCD provides signal processing to guard against adjacent channel interference. The CCD is a tapped analog delay line. The filter characteristics of this device are determined by the tap weights in the CCD.

U.S. Pat. No. 5,678,213 to Myer discloses a low noise amplifier in a CDMA cellular system having a plurality of bandpass filters. One of the filters is a bandpass filter with a passband of nominal width for receiving an input signal provided by the antenna. The other filters isolate the desired carrier signal from the spurious signals in the mixed down signal. The bandwidth of these filters depend on the operating system in which they are intended to operate.

SUMMARY OF THE INVENTION

In view of the foregoing background, it is therefore an object of the present invention to provide a radio transceiver, such as a cellular telephone, having enhanced cross-modulation performance.

It is another object of the invention to provide such a radio transceiver without placing a higher demand on the LNA in terms of supply voltage and/or current headroom requirements.

These and other objects, features and advantages in accordance with the present invention are provided by a radio transceiver comprising a receiver and a colocated transmitter. A duplexer may be connected to an output of the transmitter and to an input of the receiver and an antenna, which may couple undesired signals from the transmitter to the receiver. The receiver includes an LNA comprising a nonlinear portion capable of generating undesired cross-modulation signals based upon a portion of the transmit signal coupled thereto from the duplexer and a signal from another nearby transmitter. A bandpass filter may be connected to an output of the LNA, and at least one downconverter stage is connected to an output of the bandpass filter. A reactive termination circuit is preferably connected between the LNA and the bandpass filter for changing an impedance presented to the output of the LNA to thereby reduce undesired cross-modulation signals.

The reactive termination circuit preferably operates at the frequency of the receive signal coupled to the receiver via the duplexer. This signal is typically an amplitude modulated (AM) spread spectrum signal. According to one important feature of the invention, the reactive termination circuit terminates an output transresistance stage of the LNA into an AC short circuit at the frequency of the colocated transmitter signal, and terminates the in-band signal from an adjacent transmitter in a resistive termination. This significantly lowers the linearity requirements of the output transresistance stage of the LNA.

The reactive termination circuit is preferably a pi network. The pi network includes an inductor connected between a pair of capacitors. Cross-modulation performance of the LNA is improved for out-of-band signals without putting a higher demand on the LNA in terms of supply voltage and/or current headroom requirements.

The radio transceiver may be a full-duplex system, and is preferably a dual mode Code Division Multiple Access (CDMA)/Advanced Mobile Phone System (AMPS) cellular telephone. However, the reactive termination circuit is applicable to any radio transceiver subject to cross-modulation distortion. Since a cellular telephone typically operates from a portable power source, excess power consumption is to be avoided to prolong operation. The radio transceiver preferably operates from a battery having a range of about 2.7 to 3.3 volts.

Another aspect of the invention relates to a method for improving cross-modulation performance of the LNA to out-of-band signals. The LNA comprises a nonlinear portion capable of generating undesired cross-modulation signals based upon a portion of a transmit signal from the radio transceiver coupled thereto and a signal from another adjacent transmitter. The method preferably includes the step of connecting a reactive termination circuit to the LNA for changing an impedance presented to the output of the LNA to thereby reduce undesired cross-modulation signals therefrom.

BRIEF DESCRIPTION OF THE DRAWINGS

FIG. 2b is a graph illustrating cross-modulation distortion of the output signals from an LNA according to the prior art based upon the input signals of FIG. 2a.

FIG. 2c is a graph illustrating cross-modulation distortion of the output signals from an LNA in accordance with the present invention based upon the input signals of FIG. 2a.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
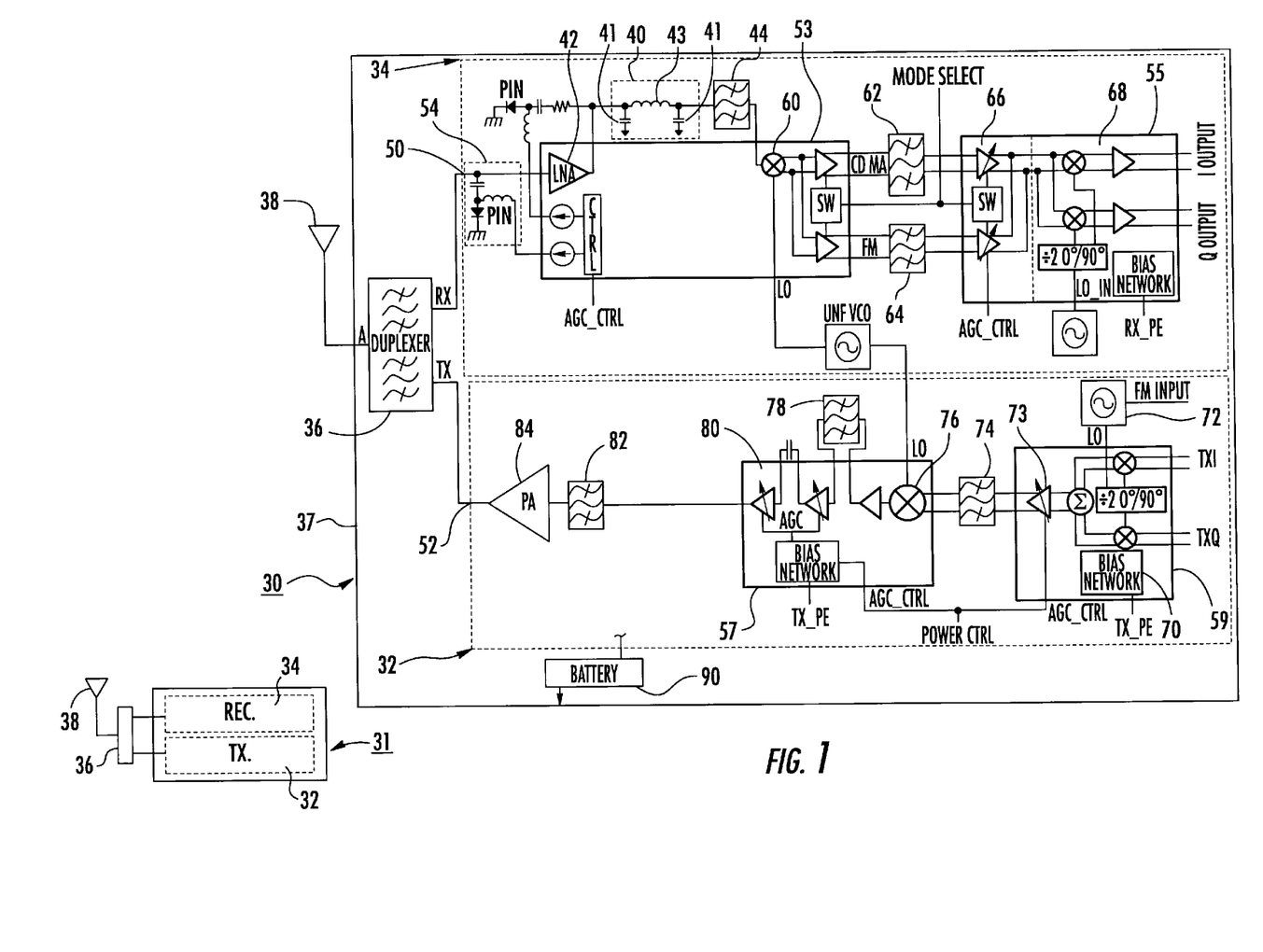
FIG. 1 is block diagram of a radio transceiver in accordance with the present invention.

Referring initially to FIG. 1, a radio transceiver 30 in accordance with the present invention is first described. The radio transceiver 30 includes a transmitter 32, a receiver 34 and a duplexer 36, within a common housing 37. The duplexer 36 supports full-duplex operation of the radio transceiver 30 by allowing the common antenna 38 to be used for simultaneously transmitting and receiving voice and/or data radio signals.

The radio transceiver 30 operates within selected frequency bands, particularly those associated with wireless communication systems. A reactive termination circuit 40 is located in the receiver 34 between an output of the low noise amplifier (LNA) 42 and an input of a bandpass filter 44 to improve cross-modulation performance of the LNA to out-of-band signals. The reactive termination circuit 40 and its effect on reducing cross-modulation distortion will be discussed in more detail following a general description of the radio transceiver 30.

The portion of the transmitter 32 illustrated in FIG. 1 is generally referred to as the transmitter front end. Likewise, the portion of the receiver 34 illustrated in FIG. 1 is generally referred to as the receiver front end. The respective back ends of the transmitter 32 and receiver 34 are not shown, and will not be discussed in any detail herein since they are not necessary for understanding the present invention.

In the illustrated embodiment, the radio transceiver 30 is a dual-mode CDMA/AMPS cellular telephone. The dual-mode CDMA/AMPS cellular telephone 30 is designed to meet IS-95A performance standards. The IS-95A standard requires that the current Advanced Mobile Phone System (AMPS) support a Code Division Multiple Access (CDMA) spread spectrum capability. In particular, the IS-95A standard defines cross-modulation performance requirements for the dual-mode CDMA/AMPS cellular telephone 30. For information on the specifics of the IS-95A standard, reference is directed to the Electronics Industries Association TIA/EIA/IS-95, "Mobile Station—Land Station Compatibility Standard for Dual-Mode Wide-Band Spread Spectrum Cellular System," published Jul. 1993.

Figure 2A:
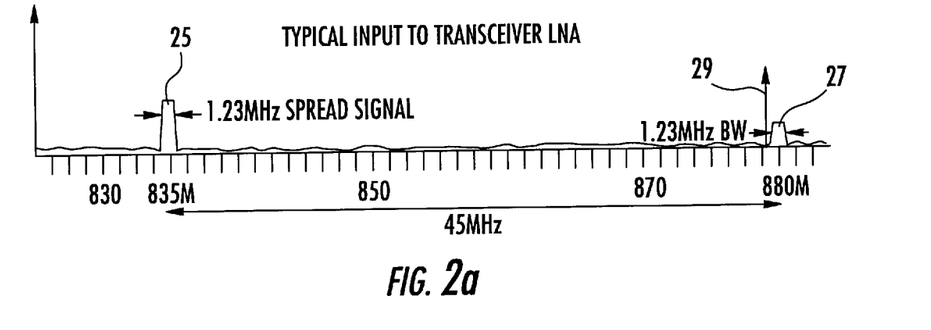
FIG. 2a is a graph illustrating inputs typically received by an LNA in a radio transceiver according to the prior art.

Input signals applied to the LNA 42 are best illustrated with reference to FIG. 2a. As discussed above, these signals include a transmit signal 25 from the colocated transmitter 32, a receive signal 27 intended for the receiver 32, and a jammer signal 29 from a nearby base station transmitter. The transmit signal 25 may be a spread spectrum CDMA signal centered at 835 MHZ with a bandwidth of 1.23 MHZ. The receive signal 27 may be a spread spectrum CDMA signal centered at 880 MHZ also having a bandwidth of 1.23 MHZ. Accordingly, there is a 45 MHZ channel spacing between the transmit and receive frequencies. The jammer signal 29 may be offset by about 900 kHz with a 30 kHz bandwidth.

Figure 2B:
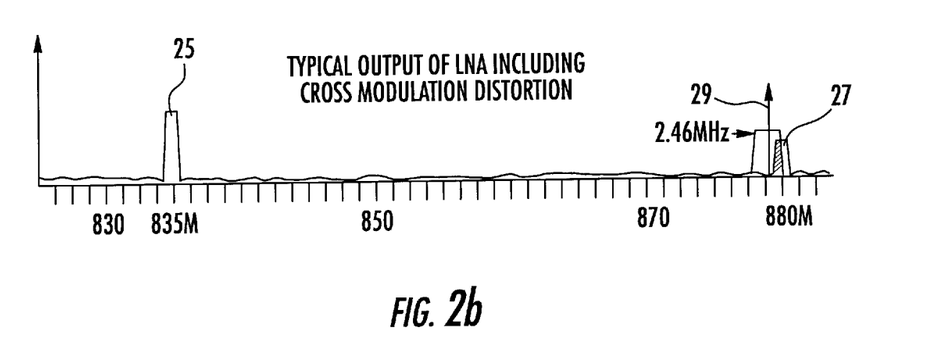
Figure 2C:
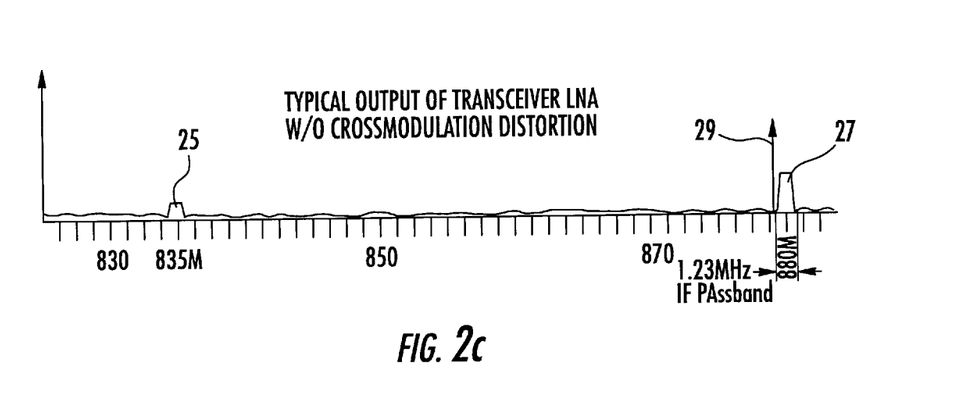

Referring to FIG. 2b, resulting output signals from the LNA 42 will be described without the reactive termination filter 40. The cross-modulation distortion causes the desired receive signal 27 to be corrupted by the jammer signal 29. Cross-modulation distortion causes the jammer signal 29 to have an increased bandwidth. In this case, the jammer bandwidth is 2.46 MHZ. Amplitude of the colocated transmit signal 25 has also increased. With the reactive termination filter 40 connected to the output of the LNA 42, the jammer signal 29 does not corrupt the desired received signal 22, as illustrated in FIG. 2c. The jammer signal 29 is still offset by 900 kHz. The reactive termination filter 40 also significantly attenuates the transmit signal 25.

The dual mode CDMA/AMPS radio transceiver 30 may preferably be formed as a radio front end chip set. More particularly, the receiver 34 may include HFA3665 and HFA3765 chips, which are manufactured by Harris Corporation, the assignee of the present invention. The HFA3665 and HFA3765 chips are indicated by reference numerals 53 and 55. The transmitter 32 may include HFA3667 and HFA3767 chips, also manufactured by Harris Corporation. These chips are represented by reference numerals 57 and 59.

The receiver 34 may operate over the frequency range of 869 to 894 MHZ, for example, and the transmitter 32 may operate over the frequency range of 824 to 849 MHZ, for example. Implementation of the reactive termination circuit 40 is not limited to operation within this frequency range, and is applicable to other frequencies, such as the 1.8 to 1.9 GHz range designated for use with Personal Communication Systems (PCS). In fact, the reactive termination circuit 40 is applicable to any radio transceiver subject to cross-modulation distortion, as will be readily appreciated by those skilled in the art.

The duplexer 36 presents a low insertion loss between the antenna 38 and the receiver input 50 for frequencies allocated for the receive channels, and provides high attenuation in the reverse direction for frequencies allocated for the transmit channels. The characteristics of the transmit path is just the reverse, as will also be appreciated by those skilled in the art.

Following the duplexer 36, an LNA automatic gain control (AGC) circuit 54 sets the total noise figure of the receiver front end. The LNA AGC circuit 54 is the first circuit portion to reduce cross-modulation and intermodulation distortion. Although the rejection of the by-products generated by intermodulation is generally acceptable for proper operation of the receiver 34, very large signals can propagate throughout the entire receiver front end all the way to the input of the baseband filters (not shown). This imposes difficult signal handling restrictions for the battery operated circuits.

The LNA 42 typically has nonlinear characteristics capable of generating an undesired cross-modulation signal. Generation of the undesired cross-modulation signal is based upon a portion of a transmit signal coupling through the duplexer 36 to an input of the LNA 42, and interacting with a jammer signal provided by a nearby transmitter 31. Assuming the input stage of the LNA 42 meets input linearity requirements, then the output stage of the LNA must not distort the output signals due to voltage or current limitations of the LNA.

In other words, if the output of the LNA 42 includes desired and undesired signals, they must both be fully amplified. Otherwise, the signals will be clipped, including the desired signals. Accordingly, this puts a higher demand on the LNA 42 in terms of supply voltage and/or current headroom requirements. If the undesired out-of-band signal from the colocated transmitter was reduced or eliminated, then the LNA 42 could operate at a lower supply voltage since it need only amplify the desired signals.

The reactive termination circuit 40 is connected between the output of the LNA 42 and an input of a bandpass filter 44. The reactive termination circuit 40 may preferably be a pi network, as shown in FIG. 1. The reactive termination circuit 40 changes an impedance presented to the output of the LNA 42 to reduce undesired cross-modulation signals therefrom. The reactive termination filter 40 and its effect on improving cross-modulation for an LNA 42 having non-linear characteristics is discussed in greater detail below.

The bandpass filter 44 preferably has a passband of 25 MHZ which defines the total IS-95A standard receive channel allocation after the LNA 42. The bandpass filter 44 also reduces the image noise generated by the LNA 42 and blocks the remaining undesired transmitter signal from saturating the downconverter 60.

The downconverter 60 generates an 83.38 MHZ IF for the CDMA and AMPS mode of operation. First and second selectable SAW filters 62, 64 are connected to respective outputs of the downconverter 60. For the CDMA spread spectrum mode of operation, the first SAW filter 62 operates with a 1.23 MHZ bandwidth to operate as the channel selection filter. The second SAW filter 64 operates with a common 30 KHz bandwidth required for the AMPS channel spacing requirement. The next stage in the receiver front end is the IF AGC amplifier 66 for providing the remaining dynamic range of the receiver 34 when the front end AGC 50 is at a minimum.

A baseband processor (not shown) controls the IF AGC 66 by monitoring the combination of desired and undesired signal strengths, noise floor and spurious responses, and by taking appropriate action. When small desired signals and higher interference signal levels are present, the receiver front end has its gain reduced and the IF AGC 66 picks up the required gain to maintain a constant and reliable baseband signal. Following the IF AGC 66, a last stage in the receiver front end is the baseband quadrature downconverter 68. This device down converts or translates the IF of 83.38 MHZ to baseband I and Q signals for processing.

The transmitter 32 follows a single conversion architecture like the receiver 34. An IF quadrature (I/Q) modulator 70 is used for the CDMA QPSK mode of operation. For the analog AMPS mode of operation, the quadrature modulator 70 operates as a vector modulator establishing a constant carrier output. FM modulation for the AMPS mode of operation is performed by an external controlled VCO 72 which generates the reference local oscillator for the quadrature modulator 70.

The quadrature modulator 70 is followed by a controlled attenuator 73 that controls the power control range of the transmitter 32. Output characteristics of the attenuator 73 require highly linear operations and a low noise figure across the attenuation range. A three-pole LC filter 74 follows this output to improve the reference oscillator leakage and spurious response of the transmitter 32.

An RF upconverter 76 generates the RF carrier and is followed by a transmit channel allocation filter 78, similar to the bandpass filter 44 in the receiver 34. The allocation filter 78 removes part of the RF LO leakage from the RF upconverter 76, and removes the image signal generated by the same mixer. A two-stage variable gain preamplifier 80 with AGC control is connected to an output of the allocation filter 78. The preamplifier 80 is followed by another bandpass filter 82 to further improve the LO leakage and remove any out-of-band spurious signals. A power amplifier 84 is connected to an output of the bandpass filter 82, and an output of the power amplifier 84 is connected to the duplexer 36.

Referring now to FIGS. 3–15, the reactive termination filter 40 and its effect on improving the cross-modulation performance of the LNA 42 to out-of-band signals will be discussed in more detail. As previously stated, cross-modulation is directly related to the third order intercept point IP3 of the LNA 42, and also to the available bandwidth of the LNA.

More particularly, cross-modulation in the illustrated radio transceiver 30 is the undesired transfer of AM signal from an AM RF carrier onto another carrier, which is typically not modulated. This other carrier signal is generally provided by a cellular service provider base station transmitter tower. Since cross-modulation occurs in all non-linear elements, and is a third order intermodulation distortion product, a useful figure of merit to determine the amount of cross-modulation that occurs in a non-linear element is the element's third order intercept point.

If AMJAM is the level of the AM carrier in dBm, CWJAM is the level of the unmodulated carrier in dBm, and IIP3 is the input third order intercept point of the LNA 42 in dBm, then the cross-modulation that results as related to the input of the LNA is Icm, as provided by equation 1:

$$Icm=2*(AMJAM-IP3)+CWJAM. \quad (1)$$

If both the undesired AM signal and the CW signal are in the passband of the bandpass filter 44, the reactive termination circuit 40 cannot be advantageously used. In this case, the required input third order intercept point IIP3 is provided by equation 2:

$$IIP3=(CWJAM-Icm)/2+AMJAM. \quad (2)$$

The required output intercept point of the LNA 42 in this case is the product of the input third order intercept point IIP3 and the gain PG of the LNA 42, as provided by equation 3:

$$OIP3=IIP3+PG. \quad (3)$$

If the undesired AM signal is outside of the passband filter 44, the proper use of the reactive termination circuit 40 at the frequency of the AM signal lowers the demands on the output limited third order intercept point OIP3 of the LNA 42. For example, if the transmitter modulation has significant AM modulation, such as in the CDMA mode of operation, cross-modulation of the transmit leakage signal onto an in-band CW jammer will occur, and will drive the requirements of the LNA third order intercept point.

For IS-98A applications, the required LNA IIP3 is approximately +8 dBm, and for J-STD-018 applications the required LNA IIP3 is approximately +15 dBm. If the gain of the LNA 42 is 14 dB, for example, the required OIP3 ranges from +22 dBm to +29 dBm. For any given LNA 42 efficiency, this level of OIP3 will set the required operating voltage and current headroom requirements in the LNA output stage, and will also set the required linearity in the LNA input stage, as will be readily understood by one skilled in the art.

The required LNA input limited IIP3 can be derived from the equation (2). There is no known method to provide relief from this requirement. In a typical common emitter single stage amplifier, emitter degeneration can be used to meet the required level of input limited IIP3. Inductive degeneration would primarily be used if the noise figure is to be preserved. Degeneration maintains the applied AC input across the base-emitter junction at a small level with respect to the thermal voltage to ensure operation of the input transconductance stage in a linear manner.

Assuming the input transconductance stage meets the input linearity requirements, then the output transresistance stage must not distort due to voltage or current headroom limitations. In the case of a broadband resistive output termination, the required voltage and current swings will be driven by the need to satisfy the output limited IP3 point.

If the AM signal is outside of the system bandpass filter 44, the reactive termination circuit significantly lowers the linearity requirements of the output transresistance stage. By terminating the transresistance stage in an AC short circuit at the frequency of the AM signal, and terminating the in-band CW signal in a resistive termination, equation (3) may be ignored without degrading cross-modulation performance. The resulting system impacts from the use of a reactive termination circuit 40 is a reduction in supply voltage and/or current of the LNA 42, without significantly degrading the cross-modulation performance of the LNA.

Input compression performance of the LNA 42 without the reactive termination circuit 40 is illustrated together with input and output intercept points below in Table 1. Input compression is another form of distortion, which is readily understood by one skilled in the art. When 3.0 volts is applied to the collector terminal of the LNA 42, the input intercept point (IIP3) is 2.2 dBm with an input compression point (Inp.P1DB) of −10.3 dBm. The IIP3 point is obtained with a typical dual tone output IP3 test. As the collector voltage of the LNA 42 is increased from 3.0 volts to 3.6 volts, the input IIP3 point increases to 6.4 dBm and the input compression point increases to −7.6 dBm. Likewise, as the collector voltage of the LNA 42 is increased from 3.6 volts to 4.2 volts, the input IIP3 point increases to 7.0 dBm along with an increase of the input compression point to −6.3 dBm.

However, referring again to Table 1, raising he collector voltage from 4.2 volts to 4.8 volts does not provide an improvement in the input IIP3 point or the input compression point. A higher IIP3 point indicates the value at which the LNA 42 will begin to distort. The tradeoff between a higher IIP3 point is a higher collector voltage for the LNA 42, which is undesirable because of the additional drain on the portable power supply 90. The portable power supply 90 is preferably a portable battery having a range of about 2.7 to 3.3 volts. The gain of the LNA 42 is +15.7 dB for each of the input IIP3 points.

TABLE 1

| VLNA | OIP3 | IIP3 | Inp.P1DB |
| --- | --- | --- | --- |
| 3.0 V | 17.9 dBm | 2.2 dBm | −10.3 dBm |
| 3.6 V | 22.1 dBm | 6.4 dBm | −7.6 dBm |
| 4.2 V | 22.7 dBm | 7.0 dBm | −6.3 dBm |
| 4.8 V | 22.7 dBm | 7.0 dBm | −6.3 dBm |

Referring now to FIGS. 3–6, cross-modulation performance is provided for the LNA 42 and the bandpass filter 44 without the reactive termination circuit 40. The reference signals producing the cross-modulation distortion is a transmit CDMA signal combined with a CW inband jammer signal. The CW inband jammer signal provides −25 dBm of power at the input of the LNA 42.

Figure 3:
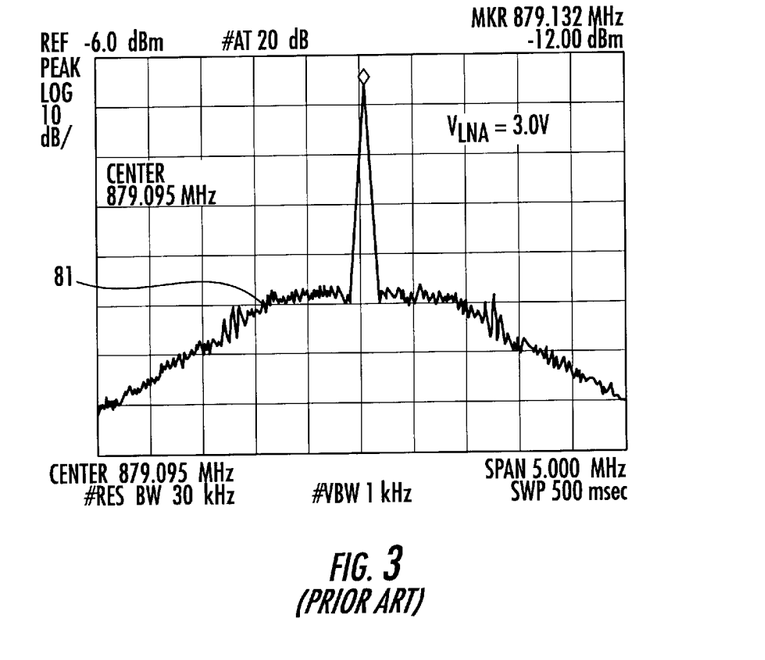
FIGS. 3–6 are graphs of the cross-modulation performance of the LNA and bandpass filter receiving a Jammer signal from a nearby transmitter without the reactive termination circuit, according to the prior art.
Figure 4:
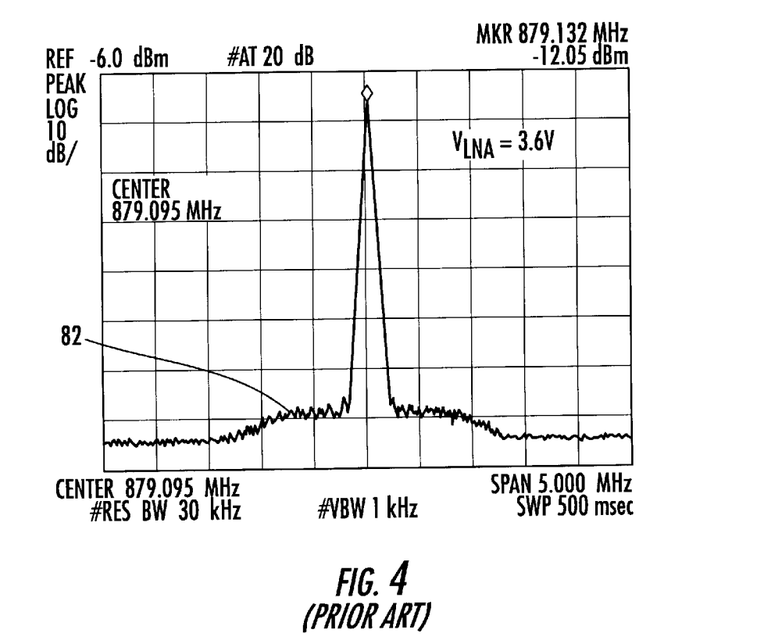
Figure 5:
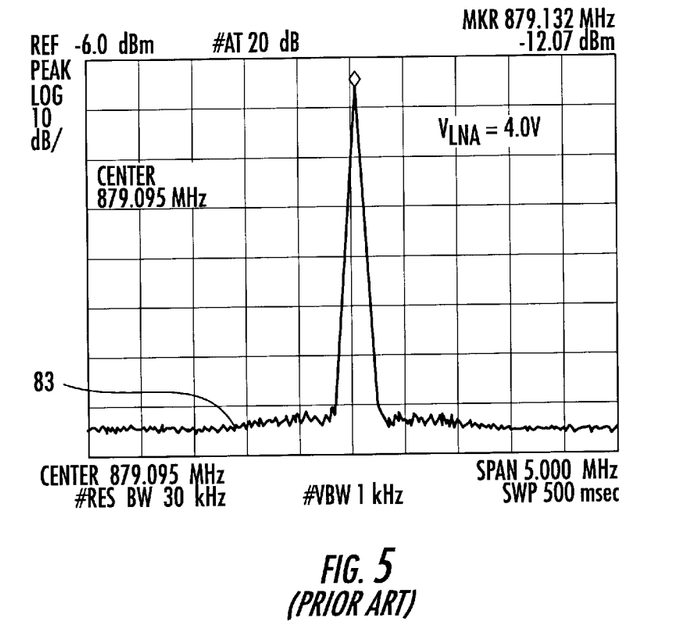
Figure 6:
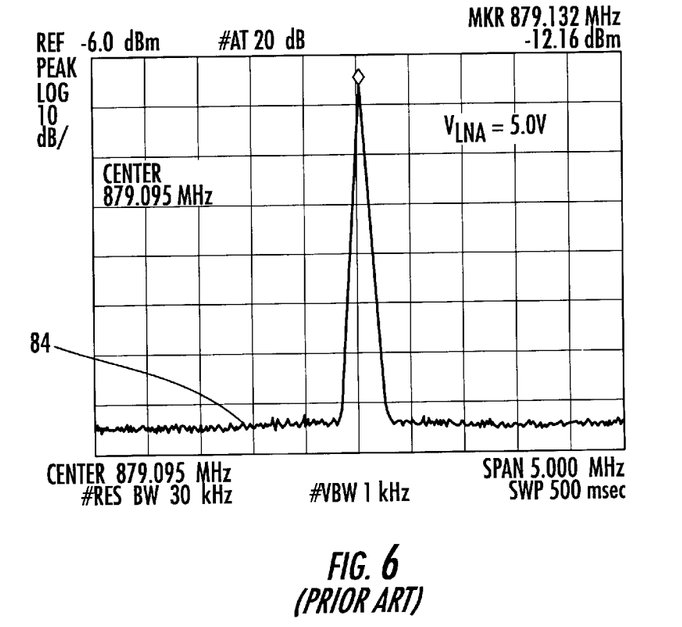

The cross-modulation distortion without the reactive termination circuit 40 provides a considerable amount of cross-modulation signal products in a form of noise floor when the collector voltage of the LNA 42 is 3 volts, as best shown in FIG. 3. A high level of cross-modulation signal energy may mask the desired signal at the input of the LNA 42. The cross-modulation energy, indicated as reference 81, 82, 83 and 84 in each of the respective figures, is significantly reduced when the collector voltage of the LNA 42 is increased. However, reducing this apparent noise floor by raising the supply voltage of the LNA 42 is not desirable since this tends to shorten the operating time of the portable battery supply 90.

Figure 7:
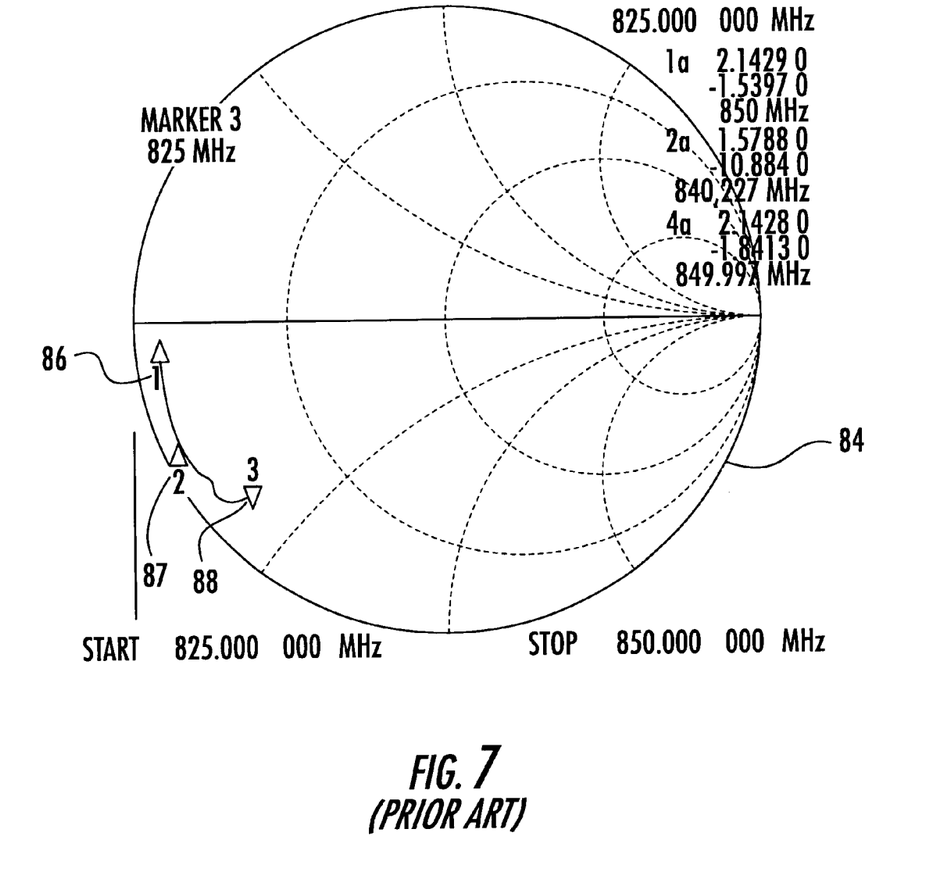
FIG. 7 is a Smith chart illustrating out-of-band impedances of the bandpass filter for transmit frequencies from the colocated transmitter without the reactive termination circuit, according to the prior art.

Referring now to FIG. 7, the characteristics of the bandpass filter 44 without the reactive termination circuit 40 are provided. The insertion loss of the bandpass filter 44 without the reactive termination circuit 40 is approximately 2.8–3.3 dB. A Smith chart 84 may be used to illustrate the out-of-band characteristic impedances of the bandpass filter 44 for the cross-modulation transmit source frequencies.

The low impedances of the bandpass filter 44 can advantageously be used once the output of the LNA 42 sees a very low transformed impedance at that band. For this reason, and due to layout delays, it is important to rotate or delay the transformed impedance to bring all the reactive components to a minimum. Therefore, the available load at these frequencies is minimized.

In one embodiment, the reactive termination circuit 40 is a pi network, as best shown in FIG. 1. The pi network includes an inductor 43 connected between a pair of capacitors 41. Pi networks are well known by one skilled in the art. Values for the capacitors 41 are selected to find an optimum setting of the reactive termination circuit 40. Varying the capacitive values causes the filter impedance of the bandpass filter 44 to rotate around the Smith chart 84, as indicated by references 86–88.

Figure 8:
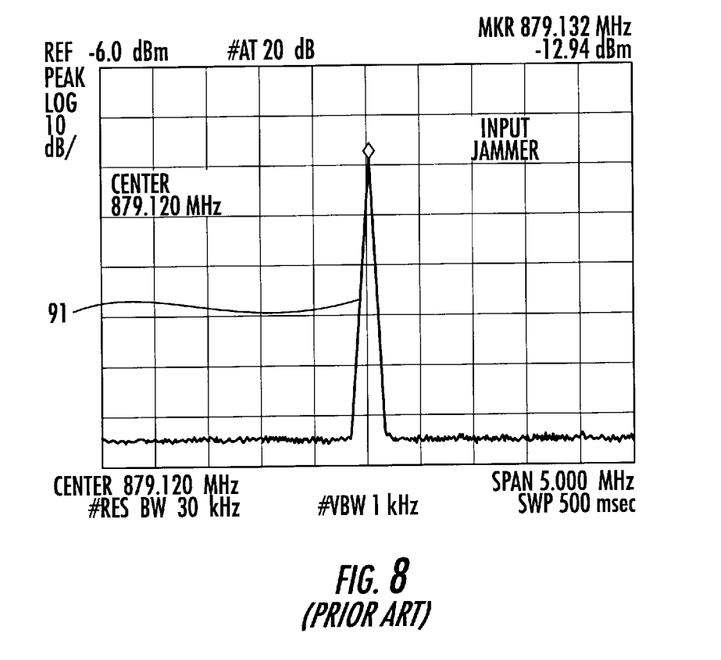
FIG. 8 is a graph of an input jammer signal from a nearby transmitter used to produce the cross-modulation distortion, according to the prior art.
Figure 9:
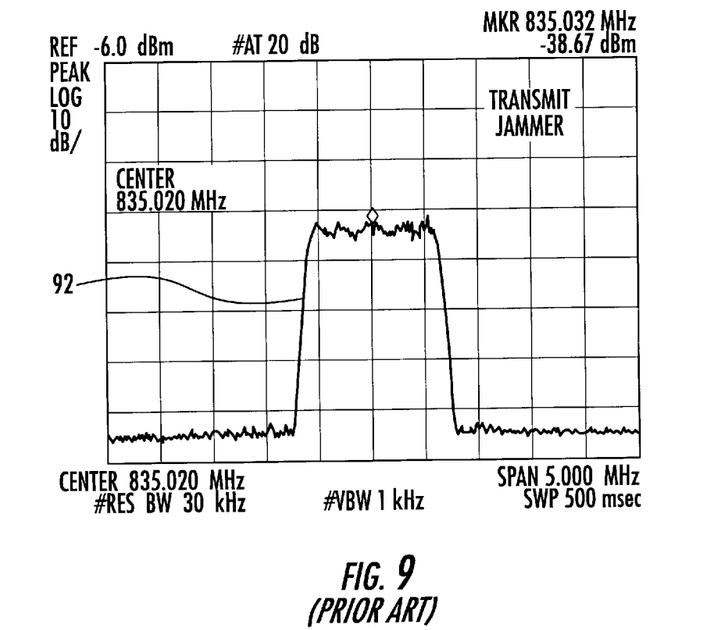
FIG. 9 is a graph of the colocated transmitter CDMA signal used to produce the intermodulation distortion, according to the prior art.

As an example, the jammer signal 91 and the colocated transmit signal 92 that interact to produce the cross-modulation distortion are respectively shown in FIGS. 8 and 9. The transmit signal 92 is an AM spread spectrum signal, and the jammer signal 91 is a CW signal providing −25 dBm of power at the input of the LNA 42.

Figure 10:
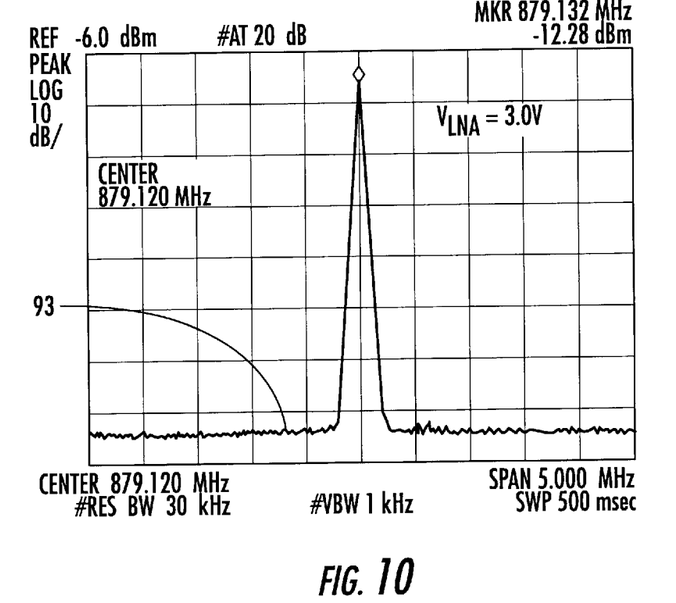
FIGS. 10–11 are graphs of the cross-modulation performance of the LNA and bandpass filter with the reactive termination circuit, according to the present invention.
Figure 11:
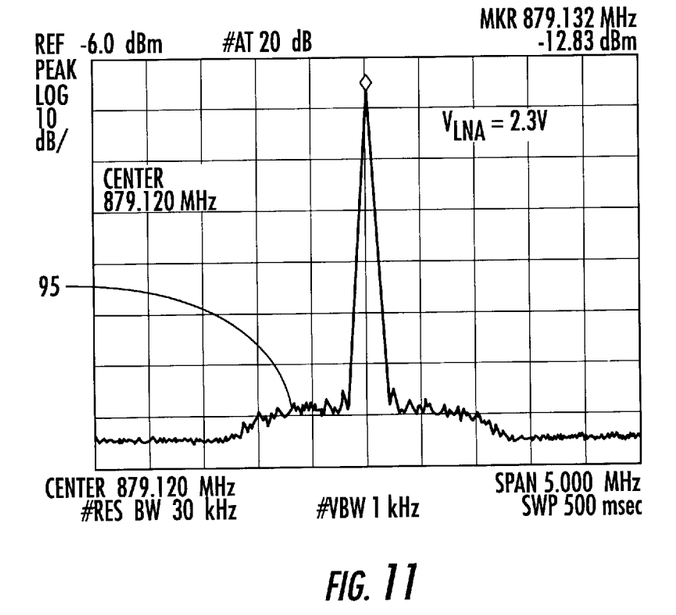
Figure 12:
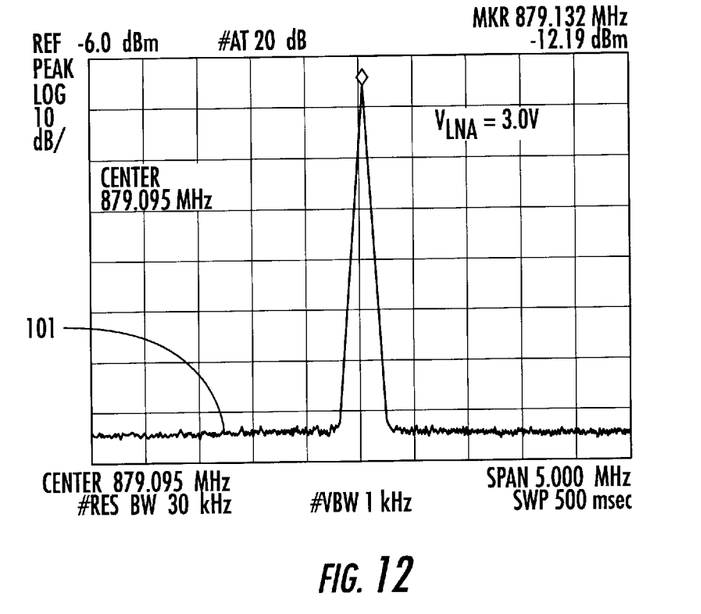
FIGS. 12–15 are additional graphs of the cross-modulation performance of the LNA and bandpass filter with the reactive termination circuit, according to the present invention.
Figure 13:
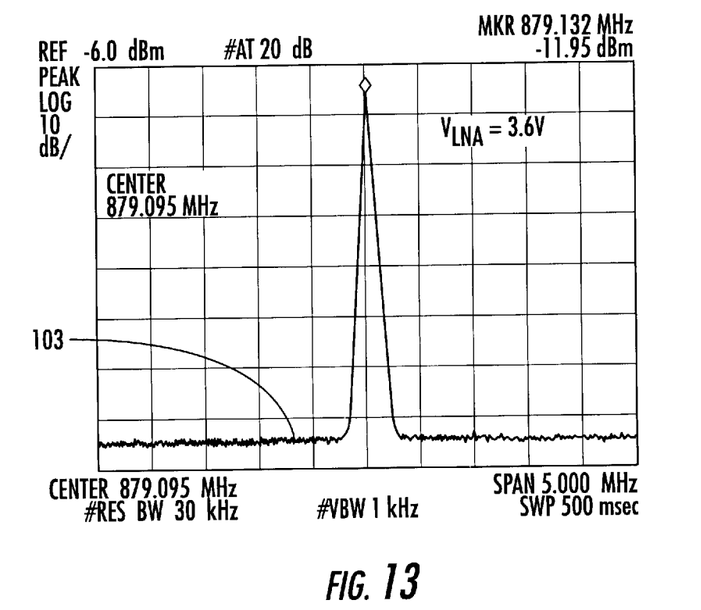
Figure 14:
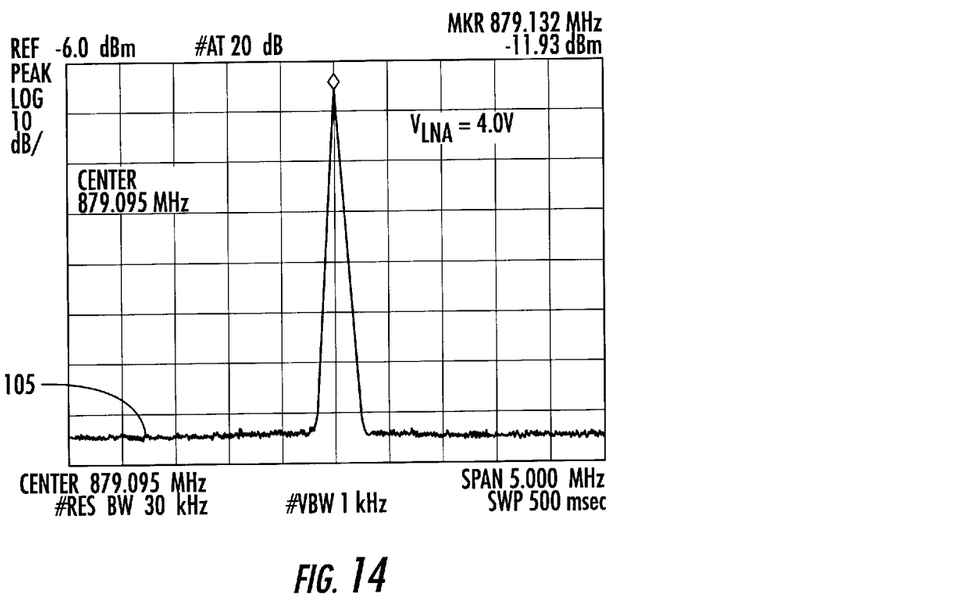
Figure 15:
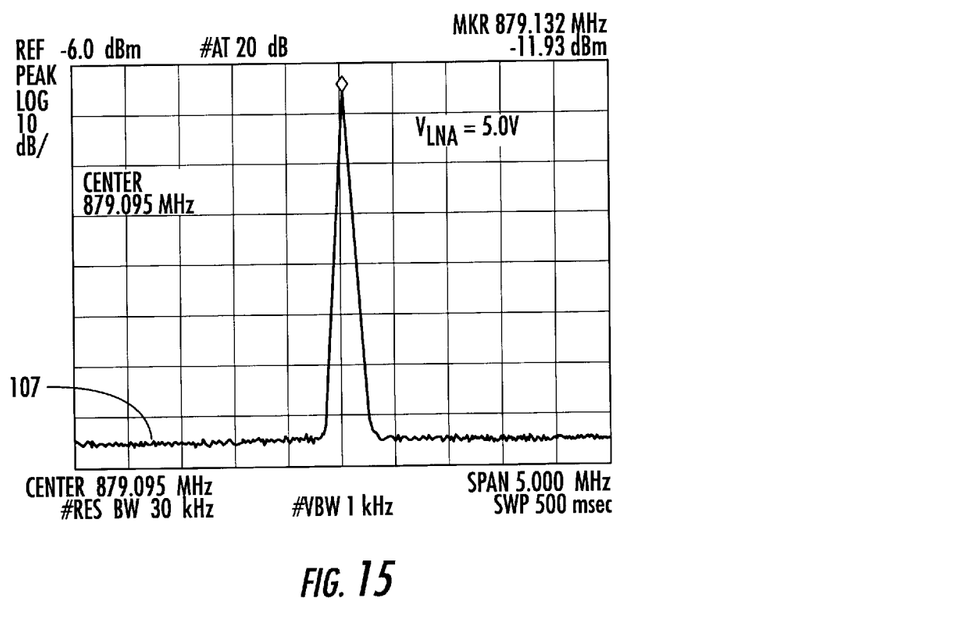

With the reactive termination circuit 40 between the output of the LNA 42 and the input of the bandpass filter 44, the cross-modulation improvement is shown in FIGS. 10 and 11. The center frequency is 879.12 MHZ in FIGS. 10 and 11. The apparent noise floor 93 and 95 has been significantly reduced with the reactive termination circuit 40, as compared to the apparent noise floor 81 in FIG. 3 that does not include the reactive termination circuit. The collector voltage for the LNA 42 is 3.0 volts for both FIGS. 3 and 10. The collector voltage has been reduced to 2.3 volts for the graph of FIG. 11. Consequently, the resulting noise floor 95 rises as the collector supply voltage is reduced below 3.0 volts. The improvement in cross-modulation is thus obtained by shifting the filter impedance to a minimum value as seen by the output of the LNA 42. Accordingly, the intermodulation distortion for out-of-band signals are significantly reduced.

FIGS. 12–15 are additional graphs of the cross-modulation performance of the LNA 42 and the bandpass filter 44 with the reactive termination circuit 40. The center frequency is 879.095 MHZ, and the collector voltage for the LNA 42 is respectively 3.0, 3.6, 4.0 and 5.0 volts for FIGS. 12–15. The noise floor 101, 103, 105 and 107 respectively remains at a significantly low level for each of these figures. As a comparison, reference is made to FIGS. 3–6, which plot the same conditions as FIGS. 12–15, except without the reactive termination circuit 40. Improvement in cross-modulation performance to out-of-band signals is most significant when the collector voltage of the LNA 42 is about 3.0 volts.

Another aspect of the invention relates to a method for improving cross-modulation performance of the LNA 42 to out-of-band signals. The LNA 42 has nonlinear characteristics in a radio transceiver 30 and is capable of generating undesired cross-modulation signals based upon a portion of a transmit signal from the radio transceiver 30 coupled thereto and a signal from a nearby base station transmitter.

The method preferably includes the steps of connecting a bandpass filter 44 to an output of the LNA 42, and connecting at least one downconverter stage 60 to an output of the bandpass filter 44. The method further includes the step of connecting a reactive termination circuit 40 between the LNA 42 and the bandpass filter 44 for changing an impedance presented to the output of the LNA to thereby reduce undesired cross-modulation signals therefrom.

Many other modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed:

1. A radio transceiver comprising:
    a receiver, and a transmitter colocated with said receiver; and
    a duplexer connected to said collocated transmitter and said receiver and coupling undesired signals from said colocated transmitter to said receiver;
    said receiver comprising
        a low noise amplifier comprising a nonlinear portion generating undesired cross-modulation signals based upon signals from said colocated transmitter and another nearby transmitter,
        a bandpass filter connected to an output of said low noise amplifier,
        at least one downconverter stage connected to an output of said bandpass filter, and
        a reactive termination circuit connected between said low noise amplifier and said bandpass filter for minimizing an impedance presented to the output of the low noise amplifier at a transmitter frequency to thereby reduce the undesired cross-modulation signals.

2. A radio transceiver according to claim 1, wherein the undesired cross-modulation signals comprise amplitude modulated (AM) spread spectrum signals.

3. A radio transceiver according to claim 1, wherein said low noise amplifier comprises an output transresistance stage; and wherein said reactive termination circuit terminates the output transresistance stage into substantially an alternating current short circuit at frequencies of the colocated transmitter signals.

4. A radio transceiver according to claim 1, wherein said reactive termination circuit comprises an inductor and a pair of capacitors connected thereto in a pi network configuration.

5. A radio transceiver according to claim 1, wherein said colocated transmitter and receiver are operable in a full-duplex mode.

6. A radio transceiver according to claim 1, wherein said colocated transmitter and receiver are operable in a dual mode CDMA/AMPS cellular telephone system.

7. A radio transceiver according to claim 1, further comprising an antenna connected to said duplexer.

8. A radio transceiver according to claim 1, further comprising a battery for powering said colocated transmitter and receiver.

9. A radio transceiver according to claim 8, wherein said battery has a range of about 2.7 to 3.3 volts.

10. A radio transceiver according to claim 1, further comprising an automatic gain control circuit connected to said low noise amplifier for controlling a gain thereof.

11. A radio transceiver comprising:
    a receiver, and a transmitter colocated with said receiver, said receiver comprising
        a low noise amplifier comprising an output transresistance stage and a nonlinear portion capable of generating undesired amplitude modulated (AM) spread spectrum cross-modulation signals based upon AM spread spectrum signals from said collocated transmitter and another nearby transmitter, and
        a reactive termination circuit terminating the output transresistance stage of said low noise amplifier in substantially an alternating current short circuit at the frequencies of the colocated transmitter AM spread spectrum signals.

12. A radio transceiver according to claim 11, further comprising a bandpass filter connected to an output of said reactive termination circuit.

13. A radio transceiver according to claim 11, further comprising at least one downconverter stage connected downstream of said reactive termination circuit.

14. A radio transceiver according to claim 11, wherein said reactive termination circuit comprises an inductor and a pair of capacitors connected thereto in a pi network configuration.

15. A radio transceiver according to claim 11, wherein said colocated transmitter and receiver are operable in a full-duplex mode.

16. A radio transceiver according to claim 11, wherein said colocated transmitter and receiver are operable in a dual mode CDMA/AMPS cellular telephone system.

17. A radio transceiver according to claim 11, further comprising a duplexer connected to said colocated transmitter and receiver, and an antenna connected to said duplexer.

18. A radio transceiver according to claim 11, further comprising an automatic gain control circuit connected to said low noise amplifier for controlling a gain thereof.

19. A radio transceiver comprising:
    a receiver, and a transmitter colocated with said receiver, said receiver comprising
        a low noise amplifier comprising an output stage and a nonlinear portion capable of generating undesired amplitude modulated (AM) spread spectrum cross-modulation signals based upon signals from said colocated transmitter and another nearby transmitter, and
        a reactive termination circuit comprising a pi network terminating the output stage of said low noise amplifier in substantially an alternating current short circuit at frequencies of the colocated transmitter AM spread spectrum signals.

20. A radio transceiver according to claim 19, further comprising a bandpass filter connected to an output of said reactive termination circuit.

21. A radio transceiver according to claim 19, further comprising at least one downconverter stage connected downstream of said reactive termination circuit.

22. A radio transceiver according to claim 19, wherein said pi network comprises an inductor and a pair of capacitors connected thereto.

23. A radio transceiver according to claim 19, wherein said colocated transmitter and receiver are operable in a full-duplex mode.

24. A radio transceiver according to claim 19, wherein said colocated transmitter and receiver are operable in a dual mode CDMA/AMPS cellular telephone system.

25. A radio transceiver according to claim 19, further comprising a duplexer connected to said colocated transmitter and receiver, and an antenna connected to said duplexer.

26. A radio transceiver according to claim 19, further comprising an automatic gain control circuit connected to said low noise amplifier for controlling a gain thereof.

27. A method for reducing cross-modulation signals in a radio transceiver of a type comprising a receiver, and a transmitter colocated with the receiver; the receiver comprising a low noise amplifier including a nonlinear portion capable of generating undesired cross-modulation signals based upon signals from at the colocated transmitter and another nearby transmitter, the method comprising the steps of:

receiving, by the low noise amplifier, signals from either one of the collocated transmitter and another nearby transmitter; and reactively terminating the output of the low noise amplifier for minimizing an impedance presented thereto at a transmitter frequency to reduce undesired cross-modulation signals.

28. A method according to claim 27, wherein the undesired cross-modulation signals comprise amplitude modulated (AM) spread spectrum signals; wherein the low noise amplifier comprises an output transresistance stage; and wherein the step of reactively terminating comprises reactively terminating the output transresistance stage into an alternating current short circuit at frequencies of the colocated transmitter AM spread spectrum signals.

29. A method according to claim 27, wherein the step of reactively terminating comprises coupling an inductor and a pair of capacitors connected thereto in a pi network configuration to the output of the low noise amplifier.

30. A method according to claim 27, further comprising the step of operating the colocated transmitter and receiver in a full-duplex mode.

31. A method according to claim 27, further comprising the step of operating the colocated transmitter and receiver in one of a CDMA or AMPS cellular telephone system.

32. A method according to claim 27, further comprising the step of providing an automatic gain control circuit connected to the low noise amplifier and controlling a gain thereof.

* * * * *